(12) United States Patent
Lee

(10) Patent No.: US 10,128,483 B2
(45) Date of Patent: Nov. 13, 2018

(54) BATTERY PACK

(71) Applicant: SAMSUNG SDI CO., LTD., Yongin-si, Gyeonggi-do (KR)

(72) Inventor: Jieun Lee, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 226 days.

(21) Appl. No.: 15/002,712

(22) Filed: Jan. 21, 2016

(65) Prior Publication Data

US 2016/0248062 A1    Aug. 25, 2016

(30) Foreign Application Priority Data

Feb. 25, 2015    (KR) ........................ 10-2015-0026745

(51) Int. Cl.
| | |
|---|---|
| *H01M 2/26* | (2006.01) |
| *H01M 2/30* | (2006.01) |
| *H01M 2/10* | (2006.01) |
| *H01M 2/20* | (2006.01) |
| *H01M 2/06* | (2006.01) |

(52) U.S. Cl.
CPC ........... *H01M 2/26* (2013.01); *H01M 2/1072* (2013.01); *H01M 2/1094* (2013.01); *H01M 2/206* (2013.01); *H01M 2/30* (2013.01); *H01M 2/06* (2013.01)

(58) Field of Classification Search
CPC .... H01M 2/06; H01M 2/1016; H01M 2/1072; H01M 2/1094; H01M 2/1252; H01M 2/206; H01M 2/266; H01M 2/30
See application file for complete search history.

(56) References Cited

U.S. PATENT DOCUMENTS

| | | | | |
|---|---|---|---|---|
| 8,197,960 | B2 * | 6/2012 | Kosugi | ............... H01M 2/1038 429/149 |
| 2003/0064285 | A1 | 4/2003 | Kawamura et al. | |
| 2007/0048603 | A1 * | 3/2007 | Cherng | ................... H01M 2/06 429/159 |
| 2007/0141457 | A1 | 6/2007 | Amagai | |
| 2008/0124617 | A1 | 5/2008 | Bjork | |
| 2010/0052692 | A1 | 3/2010 | Yano et al. | |
| 2010/0124693 | A1 | 5/2010 | Kosugi et al. | |
| 2010/0310909 | A1 | 12/2010 | Yun et al. | |
| 2010/0323235 | A1 * | 12/2010 | Takami | ................. H01M 2/027 429/158 |
| 2011/0039131 | A1 * | 2/2011 | Moon | ..................... B23K 11/11 429/7 |
| 2011/0200866 | A1 | 8/2011 | Yun et al. | |
| 2012/0058391 | A1 | 3/2012 | Jiang et al. | |
| 2012/0115015 | A1 | 5/2012 | Park et al. | |
| 2012/0282516 | A1 | 11/2012 | Kim | |
| 2012/0295150 | A1 | 11/2012 | Gao et al. | |
| 2012/0328908 | A1 | 12/2012 | Han et al. | |
| 2015/0037662 | A1 | 2/2015 | Pinon et al. | |
| 2015/0125720 | A1 * | 5/2015 | Fujii | ................... H01M 2/1077 429/56 |

FOREIGN PATENT DOCUMENTS

| | | |
|---|---|---|
| CN | 102 055 002 A | 5/2011 |
| JP | 2007-265945 | 10/2007 |
| JP | 2010-009225 | 1/2010 |
| JP | 2010-123299 A | 6/2010 |
| JP | 2011-233319 | 11/2011 |
| JP | 2013-092840 | 5/2013 |
| JP | 2014-053104 A | 3/2014 |
| KR | 10-2007-0081545 A | 8/2007 |
| KR | 10-2009-0030202 | 3/2009 |
| KR | 10-2010-0026986 A | 3/2010 |
| KR | 10-2012-0048259 A | 5/2012 |
| KR | 10-2012-0123946 | 11/2012 |
| KR | 10-2013-0023059 | 3/2013 |
| WO | WO 2009/057894 A | 5/2009 |
| WO | WO 2014/024433 * | 2/2013 |
| WO | WO 2014/011801 A1 | 1/2014 |

OTHER PUBLICATIONS

Extended European Search Report dated Jul. 16, 2016.
European Office Action dated Apr. 7, 2017 for EP Application No. 16157333.2.
Extended European Search Report dated Jul. 7, 2016 for EP Application No. 16157335 which is a family member for co-pending U.S. Appl. No. 15/002,424.
U.S. Appl. No. 15/002,737, filed Jan. 21, 2016, B.A. Ridley.
U.S. Appl. No. 15/002,424, filed Jan. 21, 2016, M. Stagg.
U.S. Appl. No. 15/002,422, filed Jan. 21, 2016, M.I. Cano.
USPTO Office Action dated Aug. 23, 2017, in U.S. Appl. No. 15/002,737.
USPTO Office Action dated May 19, 2017, in U.S. Appl. No. 15/002,424.
USPTO Notice of Allowance dated May 16, 2015, in U.S. Appl. No. 15/002,424.
USPTO Office Action dated Apr. 27, 2018, in U.S. Appl. No. 15/002,422.
USPTO Office Action dated Feb. 20, 2018, in U.S. Appl. No. 15/002,737.
USPTO Office Action dated Dec. 7, 2017, in U.S. Appl. No. 15/002,424.
USPTO Office Action dated Jun. 15, 2018, in U.S. Appl. No. 15/002,737.
USPTO Office Action dated Sep. 5, 2018, in U.S. Appl. No. 15/002,422.

* cited by examiner

*Primary Examiner* — Anca Eoff
(74) *Attorney, Agent, or Firm* — Lee & Morse, P.C.

(57) ABSTRACT

A battery pack includes a battery cell including an electrode tab, a cell holder through which the electrode tab is inserted, a connection tab welded to the electrode tab and providing a welded portion above the cell holder, and a fume discharge groove located in a region of the cell holder under the welded portion.

14 Claims, 10 Drawing Sheets

BATTERY PACK

CROSS-REFERENCE TO RELATED APPLICATION

Korean Patent Application No. 10-2015-0026745, filed on Feb. 25, 2015, in the Korean Intellectual Property Office, and entitled: "Battery Pack," is incorporated by reference herein in its entirety.

BACKGROUND

1. Field

Embodiments relate to a battery pack.

2. Description of the Related Art

Unlike primary batteries, secondary batteries are rechargeable. Secondary batteries are used as energy sources of devices such as mobile devices, electric vehicles, hybrid electric vehicles, electric bicycles, and uninterruptible power supplies. Single-cell secondary batteries or multi-cell secondary batteries (secondary battery packs) in which a plurality of battery cells are electrically connected are used according to the types of external devices using the secondary batteries.

SUMMARY

Embodiments are directed to a battery pack including a battery cell including an electrode tab, a cell holder through which the electrode tab is inserted, a connection tab welded to the electrode tab and providing a welded portion above the cell holder, and a fume discharge groove located in a region of the cell holder under the welded portion.

The fume discharge groove may extend across a bottom side of the connection tab.

The fume discharge groove may be a channel that extends across a bottom side of the connection tab between first and second points of the cell holder.

The fume discharge groove may extend to an outside of the cell holder.

The cell holder may be rectangular shaped and may include a pair of parallel long sides and a pair of parallel short sides. The fume discharge groove may include a first fume discharge groove extending in a direction parallel to the long sides and a second fume discharge groove extending in a direction parallel to the short sides.

The battery pack may include a plurality of battery cells. The first fume discharge groove may successively cross bottom sides of two or more connection tabs arranged in the direction parallel to the long sides.

The battery cells may be arranged in the direction parallel to the short sides.

The first and second fume discharge grooves may be connected to each other in a region of the connection tab or in a region close to the connection tab.

The cell holder and the connection tab may include position aligning portions that provide alignment between the cell holder and the connection tab.

The position aligning portions may include a protrusion extending upward from the cell holder toward the connection tab and a hole in the connection tab to receive the protrusion.

A guide rib may be located on the cell holder to guide a sensing line.

The sensing line may be a wire connected to the connection tab or the electrode tab to transmit information about a state of the battery cell.

The battery pack may include a plurality of connection tabs. At least one of the connection tabs may include an output terminal extending to a lateral side of the cell holder.

A threaded part may be coupleable to the output terminal to connect an output cable to the output terminal.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
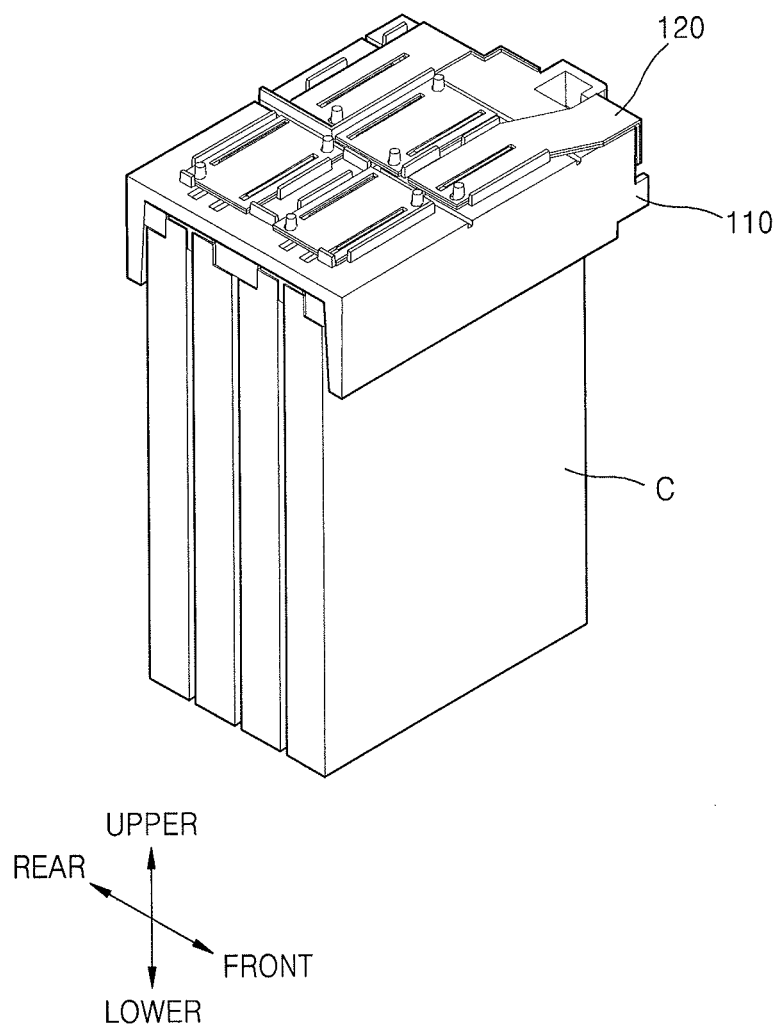
FIG. 1 illustrates a view depicting a battery pack according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
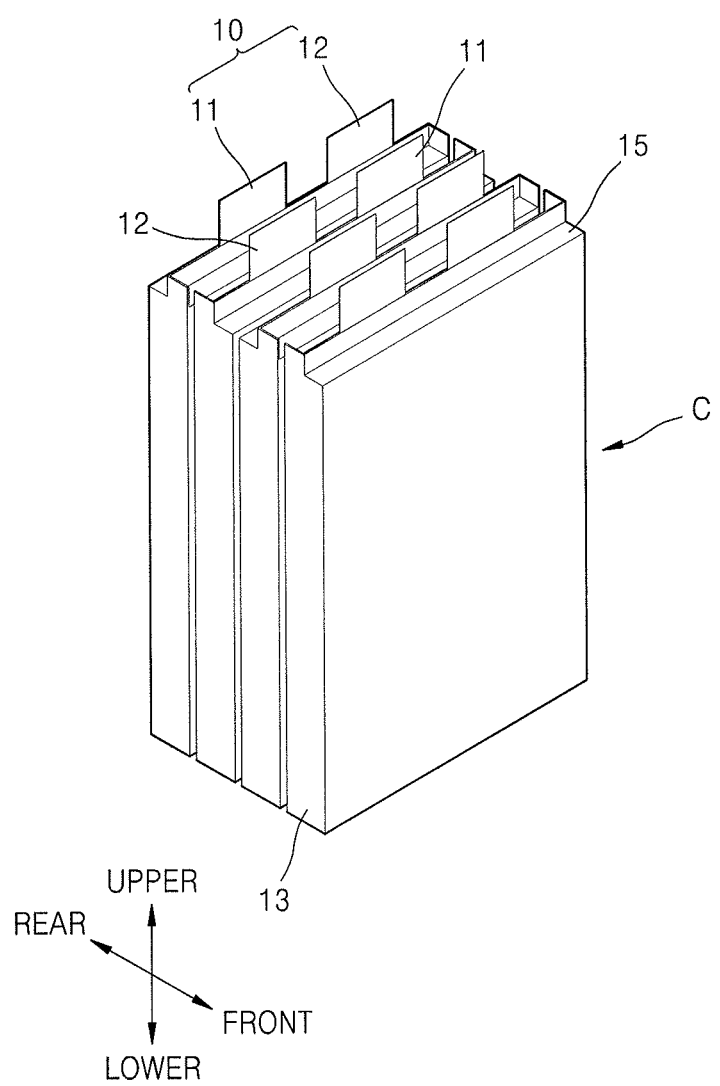
FIG. 2 illustrates a perspective view of battery cells depicted in FIG. 1.
Figure 3:
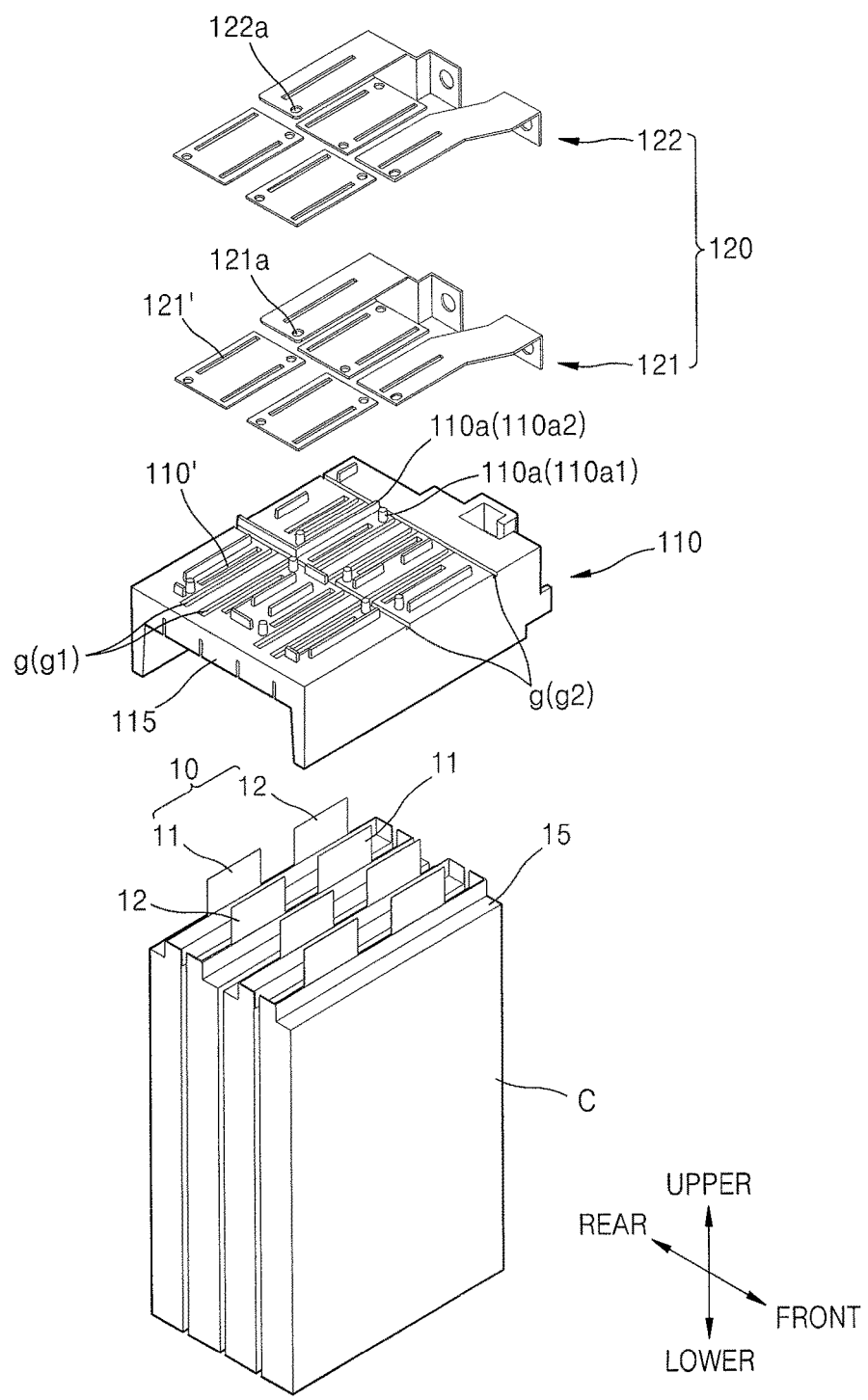
FIG. 3 illustrates an exploded perspective view of the battery pack depicted in FIG. 1.

FIG. 1 illustrates a view depicting a battery pack according to an exemplary embodiment. FIG. 2 illustrates a perspective view of battery cells depicted in FIG. 1. FIG. 3 illustrates an exploded perspective view of the battery pack depicted in FIG. 1.

Referring to FIG. 1, the battery pack may include at least two battery cells C and a cell holder 110 to which the battery cells C are coupleable. The battery cells C may include lithium-ion battery cells. Each of the battery cells C may include an electrode assembly having a stacked structure formed by first and second electrode plates having different polarities and a separator disposed between the first and second electrode plates. A plurality of first and second electrode plates and a plurality of separators may be stacked in the electrode assembly to increase the output power and capacity of the battery cell C.

In addition, referring to FIG. 2, the each of the battery cells C may include a case 13 to seal the electrode assembly. The battery cells C may be pouch type battery cells, each including a relatively flexible case 13 instead of a metal can. The battery cells C may include electrode tabs 10 electrically connected to the electrode assemblies (not shown) and extending outward from the cases 13. Each of the battery cells C may include first and second electrode tabs 11 and 12 respectively making electrical connection with the first and second electrode plates and thus having different polarities. In this specification, the term "electrode tab(s) 10" refers to one or both of the first and second electrode tabs 11 and 12. The battery cells C may include terraces 15 from which the electrode tabs 10 outwardly extend.

Referring to FIG. 3, the battery cells C may be coupleable to the cell holder 110. For example, the battery cells C may be coupleable to the cell holder 110 in such a manner that the electrode tabs 10 of the battery cells C are exposed on an upper surface of the cell holder 110. The cell holder 110 may support and hold the battery cells C. The battery cells C may be maintained at proper positions when inserted into the cell holder 110. The cell holder 110 may structurally combine the battery cells C into a single module.

The cell holder 110 may include a plurality of tab holes 110' corresponding to the battery cells C. The electrode tabs 10 extending from the battery cells C may be inserted through the tab holes 110' and exposed to the outside. The tab holes 110' may be paired such that the first and second electrode tabs 11 and 12 extending from each of the battery cells C may be inserted through a pair of the tab holes 110'. For example, the first and second electrode tabs 11 and 12 extending from one of the battery cells C may be inserted through a pair of the tab holes 110', and then the first and second electrode tabs 11 and 12 may be bent forward or backward in opposite directions to make electrical connection with neighboring battery cells C disposed in front and rear directions.

Battery cells C neighboring each other in a front-to-rear direction may be electrically connected to each other through connection tabs 120 superposed on the first and second electrode tabs 11 and 12 of the battery cells. For example, battery cells C arranged in the front-to-rear direction may be structurally modularized by the cell holder 110 and then may be electrically modularized by the connection tabs 120.

The connection tabs 120 may be superposed on the electrode tabs 10 that extend from the cell holder 110 through the tab holes 110'. The connection tabs 120 may be coupleable to the electrode tabs 10 by, for example, welding.

For example, the connection tabs 120 may include pairs of first and second connection tabs 121 and 122. Each pair of first and second connection tabs 121 and 122 may be disposed on lower and upper sides of the electrode tabs 10 to place the electrode tabs 10 therebetween. As described above, when the electrode tabs 10 are sandwiched between the first and second connection tabs 121 and 122 of the connection tabs 120 disposed on the lower and upper sides of the electrode tabs 10, electric connection between the electrode tabs 10 and the connection tabs 120 may be made more smoothly. For example, the electric contact area between the connection tabs 120 and the electrode tabs 10 may be increased. Moreover, the coupling strength between the connection tabs 120 and the electrode tabs 10 may be improved.

For example, the electrode tabs 10 extending from the battery cells C may be inserted through the tab holes 110' of the cell holder 110 and tab holes 121' of the first connection tabs 121 and exposed on upper surfaces of the first connection tabs 121. The second connection tabs 122 may be superposed on the upper surfaces of the first connection tabs 121 on which the electrode tabs 10 are exposed.

In the exemplary embodiment, the connection tabs 120 and the electrode tabs 10 may be coupled to each other by welding. In a comparative example, the connection tabs 120 and the electrode tabs 10 may be coupled to each other by soldering. However, soldering is a manual process using a large amount of solder. Accordingly, the quality of soldering may not be uniform, and the coupling between the connection tabs 120 and the electrode tabs 10 could be broken at a weak point. In addition, if solder were to scatter to another conductive part from a coupling portion, a short circuit could occur. In addition, depending on properties of a material used to form the electrode tabs 10, the electrode tabs 10 could exhibit poor bonding characteristics. For example, if the electrode tabs 10 are formed of an aluminum material, bonding errors could arise due to galvanic corrosion. In the exemplary embodiment, however, welding is used. Thus, process automation may be possible, and coupling quality may be uniformly maintained without electrical connection errors or a short circuit.

Referring to FIG. 3, the connection tabs 120 and the cell holder 110 may include position aligning portions 121a, 122a, and 110a for position alignment therebetween. For example, the position aligning portions 110a, 121a, and 122a may include protrusions 110a1 formed on the cell holder 110 and holes 121a and 122a formed in the connection tabs 120 for receiving the protrusions 110a1. Owing to coupling between the protrusions 110a1 and the holes 121a and 122a, the connection tabs 120 may be disposed at proper positions. In this state, the connection tabs 120 may be aligned with the electrode tabs 10 exposed on the upper surface of the cell holder 110 and may be connected to the electrode tabs 10.

For example, as described above, the connection tabs 120 may include the pairs of first and second connection tabs 121 and 122 disposed on the lower and upper sides of the electrode tabs 10. The first and second connection tabs 121 and 122 to be superposed at the same position may be aligned with each other by coupling the first and second connection tabs 121 and 122 to the same protrusions 110a1 formed on the cell holder 110. The position aligning portions 110a, 121a, and 122a may have suitable shapes such that the position aligning portions 110a, 121a, and 122a may regulate relative assembling positions of the connection tabs 120 and the cell holder 110.

The position aligning portions 110a, 121a, and 122a may include ribs 110a2 formed on the cell holder 110. The ribs 110a2 may extend on the cell holder 110 in one direction, and edges of the connection tabs 120 may be inserted between the ribs 110a2. The ribs 110a2 may include ribs extending in different directions and aligned with sides of the connection tabs 120.

The cell holder 110 may include support ribs 115 protruding toward the battery cells C. The support ribs 115 may protrude downwardly toward the battery cells C. The support ribs 115 may support portions of the battery cells C, for example, the terraces 15 of the battery cells C. For example, when the battery cells C are coupled to the cell holder 110 through a lower side of the cell holder 110 the support ribs 115 may help to prevent the terraces 15 of the battery cells C from colliding with a lower surface of the cell holder 110 and may maintain a proper distance between the cell holder 110 and the terraces 15 of the battery cells C, thereby helping to prevent the electrode tabs 10 from being damaged during a welding process. The support ribs 115 may protrude from the cell holder 110 toward the terraces 15 of the battery cells C. Accordingly, the coupling height of the battery cells C may be regulated to maintain a proper distance between the cell holder 110 and the battery cells C. The cell holder 110 may be less likely to be damaged by collision, and the electrode tabs 10 may be less likely to be damaged during welding.

Figure 4:
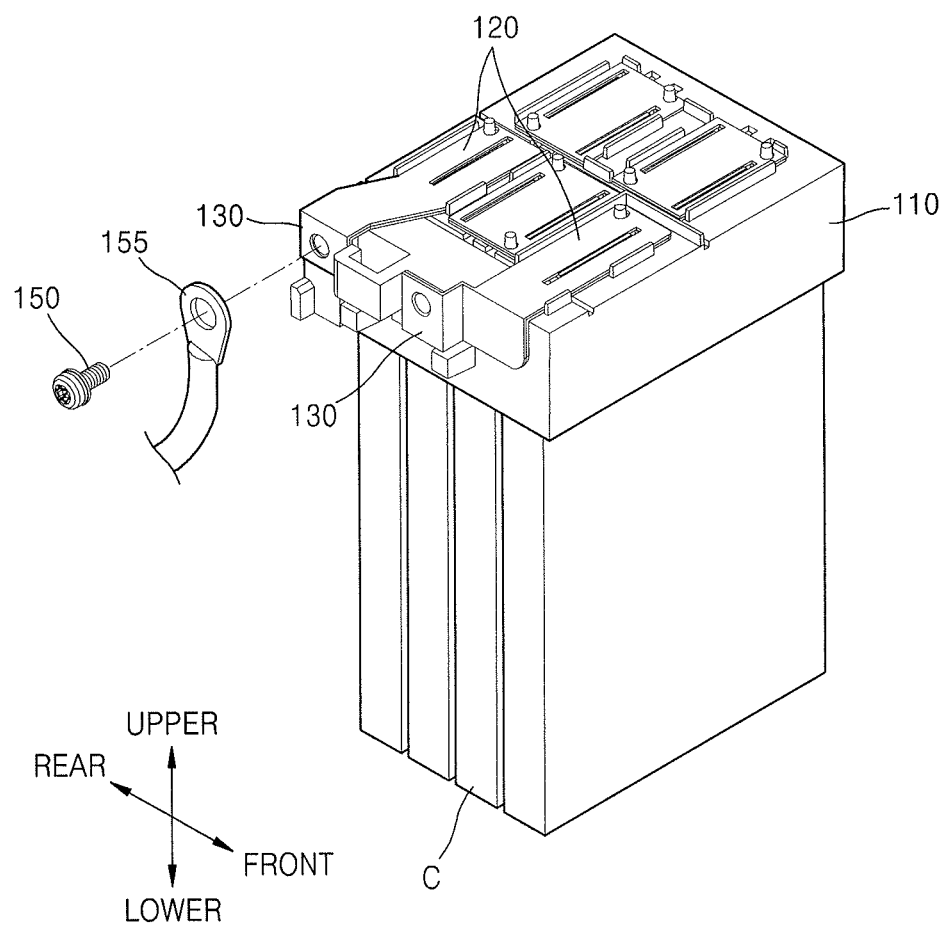
FIG. 4 illustrates a perspective view depicting output terminals.

FIG. 4 is a perspective view illustrating output terminals 130.

Referring to FIG. 4, the connection tabs 120 electrically connecting pairs of the electrode tabs 10 may include the output terminals 130. For example, a connection tab 120 disposed at a forefront position and a connection tab 120 disposed at a rearmost position may include the output terminals 130. The output terminals 130 and the connection tabs 120 may be formed as one-piece parts extending from the upper surface of the cell holder 110 to form a lateral side of the cell holder 110. Output cables 155 (only one is shown in FIG. 4) may be connected to the output terminals 130 to form a charging and discharging current path.

The output cables 155 may be connected to the output terminals 130 using threaded parts 150. When the output terminals 130 are connected to the output cables 155 using the threaded parts 150 instead of soldering or welding, a connection process may be simply performed within a short time.

Figure 5:
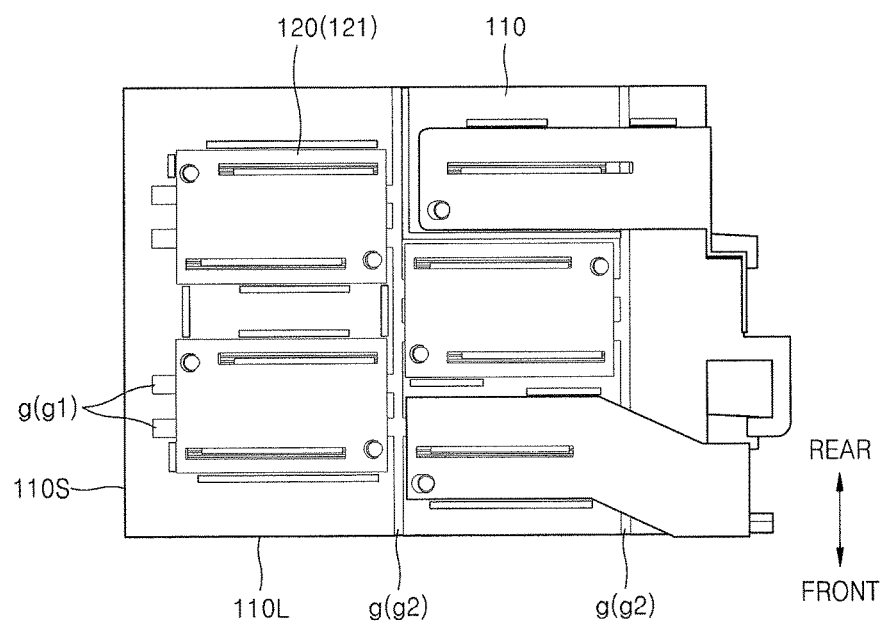
FIGS. 5 and 6 illustrate a plan view and a perspective view of an upper side of a cell holder for explaining fume discharge grooves.
Figure 6:
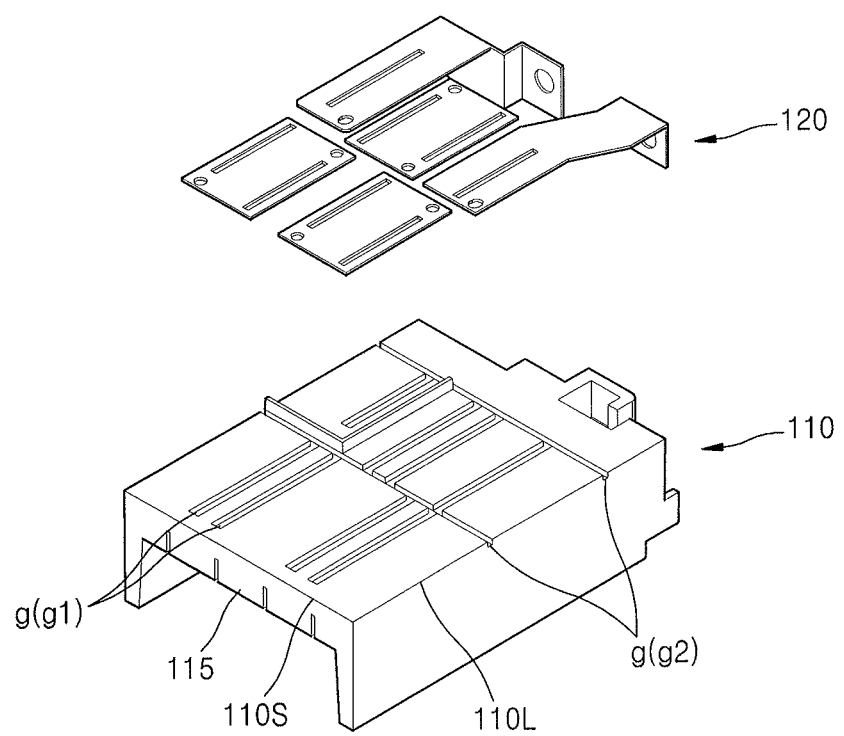

FIGS. 5 and 6 illustrate a plan view and a perspective view of an upper side of the cell holder 110 for explaining fume discharge grooves (g). For clarity of illustration, elements of the cell holder 110 other than the fume discharge grooves (g) are not shown in FIG. 6.

Referring to FIGS. 5 and 6, the fume discharge grooves (g) may be formed in the cell holder 110. The fume discharge grooves (g) may be formed to discharge welding gas and contaminants when the connection tabs 120 and the electrode tabs 10 are welded. The term "fumes" may refer to welding gas and contaminants generated as byproducts during a welding process.

The fume discharge grooves (g) may be formed under welded portions (coupling portions) between the connection tabs 120 and the electrode tabs 10. For example, the fume discharge grooves (g) may be formed in regions overlapping the connection tabs 120 (regions under the connection tabs 120) or regions close to the connection tabs 120. The fume discharge grooves (g) may be channels extending from first points to second points of the cell holder 110. For example, the fume discharge grooves (g) may be channels crossing bottom sides of the connection tabs 120 and extending away from the bottom sides of the connection tabs 120. In this case, fumes generated during welding of the connection tabs 120 may be easily discharged to the outside. The fume discharge grooves (g) may extend to the outside of the cell holder 110 such that fumes generated during welding may easily discharged to the outside of the cell holder 110.

Referring to FIG. 6, the fume discharge grooves (g) may extend on the cell holder 110 in two directions. For example, the cell holder 110 may include a pair of parallel long sides 110L and a pair of parallel short sides 110S, and the fume discharge grooves (g) may include first and second fume discharge grooves g1 and g2 extending in parallel with the long sides 110L and the short sides 110S. The first and second fume discharge grooves g1 and g2 may be formed at a plurality of positions corresponding to the connection tabs 120. For example, a plurality of battery cells C may be arranged along the short sides 110S of the cell holder 110 and coupled to the cell holder 110.

The first fume discharge grooves g1 may extend across the connection tabs 120. For example, the first fume discharge grooves g1 may extend across the connection tabs 120 in a direction parallel to the long sides 110L. As described below, the first fume discharge grooves g1 and the second fume discharge grooves g2 may extend in mutually crossing directions such that the first and second fume discharge grooves g1 and g2 may be connected to each other.

At least one of both ends of each of the second fume discharge grooves g2 may extend to the outside of the cell holder 110. For example, the second fume discharge grooves g2 may extend in parallel with the short sides 110S, and ends of the second fume discharge grooves g2 may reach the outside of the cell holder 110. The first and second fume discharge grooves g1 and g2 may extend in different directions and may meet each other in regions of the connection tabs 120 or regions close to the connection tabs 120. For example, the first and second fume discharge grooves g1 and g2 may be connected to each other in regions close the connection tabs 120. In this case, when the connection tabs 120 are welded, fumes may be rapidly discharged in two directions.

The fume discharge grooves (g) may extend across regions of the connection tabs 120 or regions close to the connection tabs 120. The terms "regions of the connection tabs 120" or "regions close to the connection tabs 120" may refer to welded portions between the connection tabs 120 and the electrode tabs 10 or regions close to the welded portions. If the fume discharge grooves (g) extend across the connection tabs 120, fumes may be efficiently discharged. In this case, however, if the connection tabs 120 and the electrode tabs 10 are suspended above the fume discharge grooves (g), a support area for a welding process could be reduced. Therefore, some of the fume discharge grooves (g) may be formed outside welding portions. For example, the second fume discharge grooves g2 may be formed at positions slightly away from the connection tabs 120.

Fumes may be rapidly discharged through the fume discharge grooves (g) when the connection tabs 120 are welded. Accordingly, the connection tabs 120 may be properly welded. For example, if fumes were to accumulate in welded portions between the connection tabs 120 and the electrode tabs 10, the quality the welded portions could be lowered, and the cell holder 110 could be damaged by the fumes having a high temperature.

In the exemplary embodiment, the output power of the battery pack may be increased by increasing the number of battery cells C included in the battery pack. For example, the battery pack may be expanded by repeatedly arranging unit packs, each being a group of battery cells C.

Figure 7:
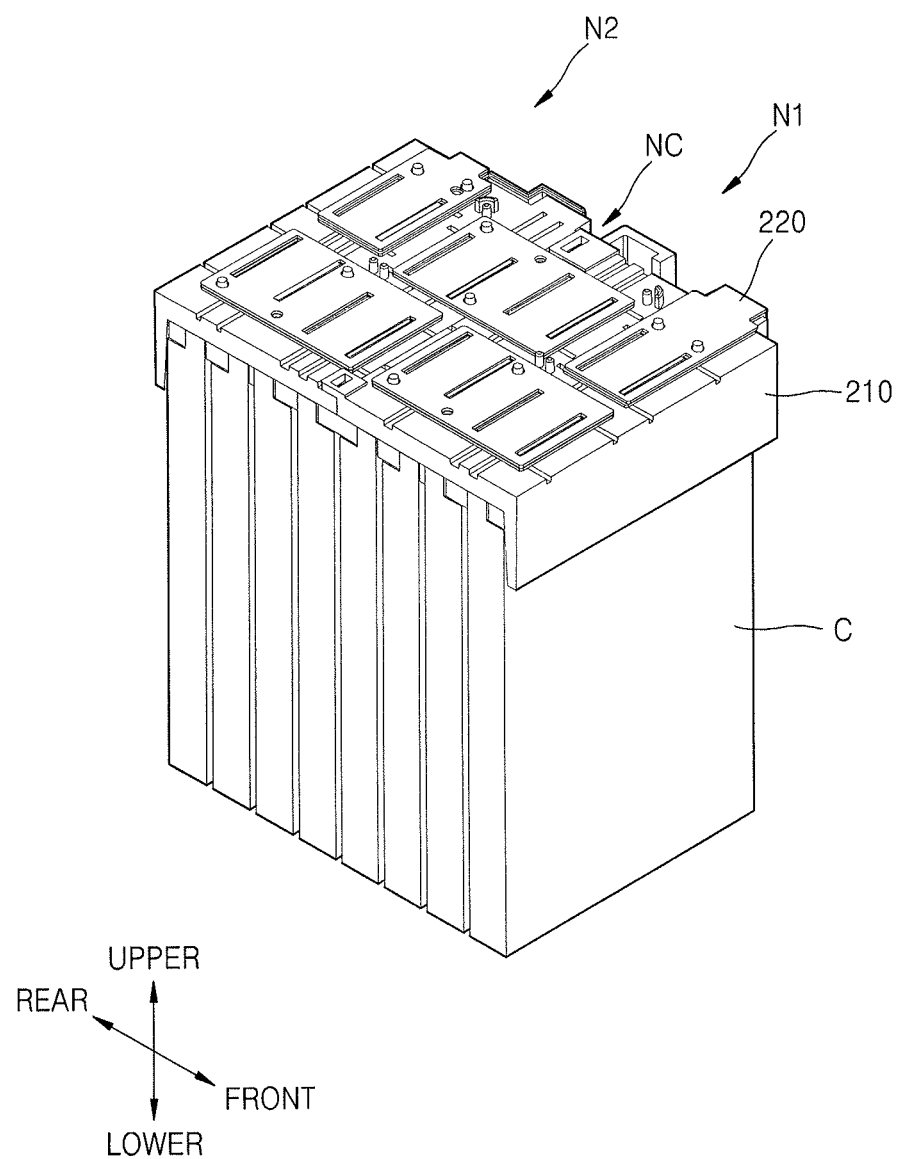
FIG. 7 illustrates a view depicting a battery pack according to another exemplary embodiment.
Figure 8:
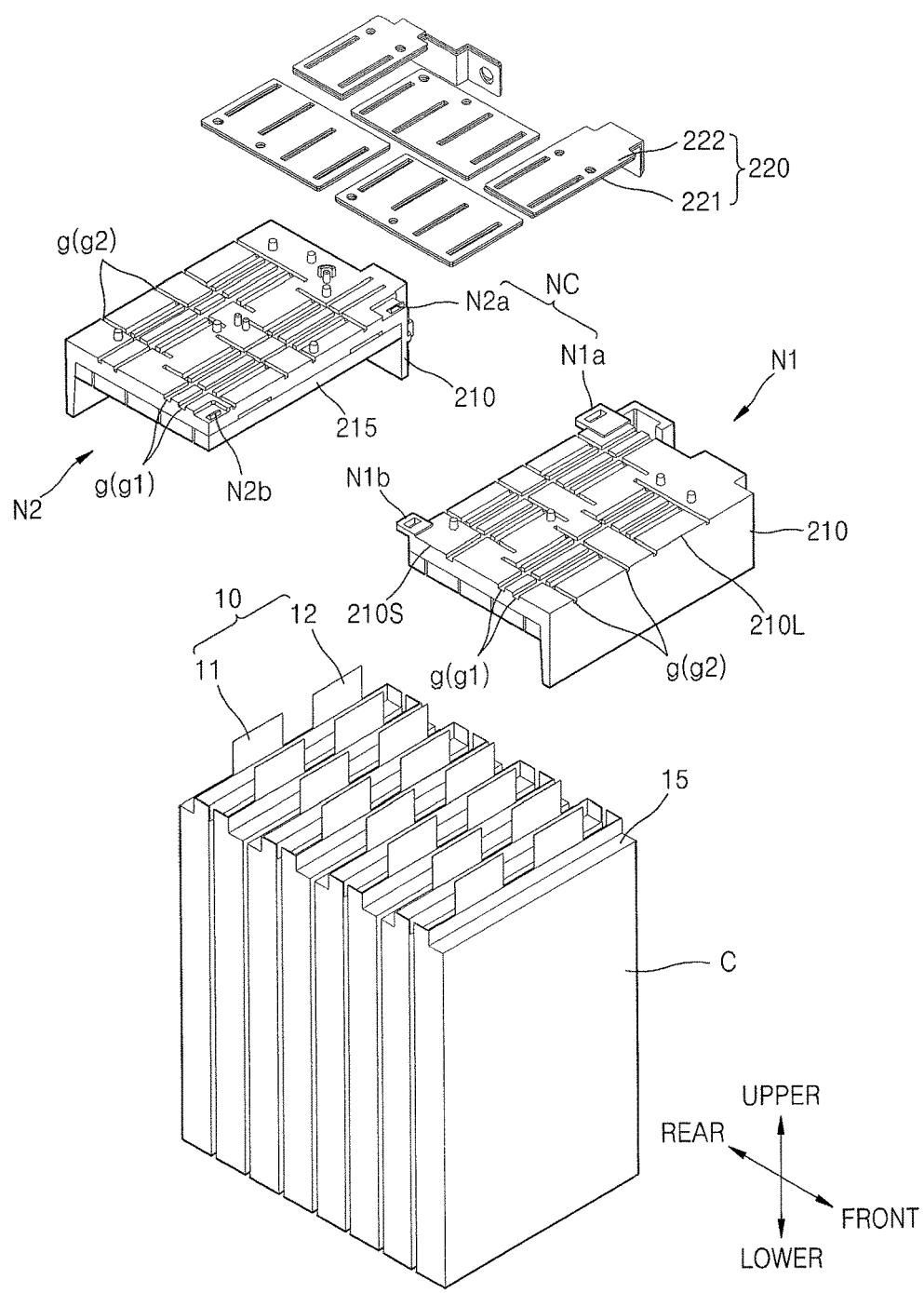
FIG. 8 illustrates an exploded perspective view depicting the battery pack depicted in FIG. 7.

FIG. 7 illustrates a view depicting a battery pack according to another exemplary embodiment. FIG. 8 illustrates an exploded perspective view of the battery pack depicted in FIG. 7.

Referring to FIG. 7, the battery pack may include a first unit pack N1 and a second unit pack N2 coupleable to each other. As described below, the battery pack may be made up of only one of the first and second unit packs N1 and N2 or may be made up of the first and second unit packs N1 and N2 according to a desired output power or capacity level. As described below, the first and second unit packs N1 and N2 may have substantially the same structure.

In the exemplary embodiment, the first and second unit packs N1 and N2 having substantially the same structure may be connected together to double the output power or capacity of the battery pack. The first and second unit packs N1 and N2 may have substantially the same structure. Accordingly, various performance requirements may be flexibly handled. For example, the battery pack may be constituted by a single unit pack such as the first unit pack N1 or the second unit pack N2 for applications requiring relatively low power levels or may be constituted by connecting the first and second unit packs N1 and N2 for applications requiring relatively high power levels. The battery pack may be constituted according to power requirements with one or more unit packs having substantially the same structure. Accordingly, the efficiency of processes for manufacturing the battery pack may be increased. Investments with respect to designs and production equipment for producing battery packs having different structures and output power levels may be avoided.

In the exemplary embodiment, the first and second unit packs N1 and N2 may have substantially the same structure. The expression "substantially the same structure" indicates that although the first and second unit packs N1 and N2 do not have completely the same structure, the first and second unit packs N1 and N2 have almost identical structures. For example, the designs of the first and second unit packs N1 and N2 may be identical except for some parts such as expansion connection parts NC (described below).

Referring to FIG. 8, cell holders 210 may include expansion connection parts NC. The expansion connection parts NC may be used to connect the first and second unit packs N1 and N2. In more detail, the expansion connection parts NC may be formed on edge portions or outer portions of the cell holders 210. The expansion connection parts NC of the first and second unit packs N1 and N2 may be coupleable to each other. For example, the cell holder 210 of the first unit pack N1 may include expansion connection parts N1a and N1b to couple with the cell holder 210 of the second unit pack N2, and the cell holder 210 of the second unit pack N2 may include expansion connection parts N2a and N2b to couple with the cell holder 210 of the first unit pack N1.

Referring to FIG. 8, the cell holders 210 may include support ribs 215 protruding downwardly from the cell holders 210 for supporting terraces 15 of battery cells C. The support ribs 215 may be brought into direct contact with the terraces 15 of the battery cells C. Connection tabs 220 for electrically connecting the battery cells C may include first and second connection tabs 221 and 222. The first and second connection tabs 221 and 222 may be disposed on lower and upper sides of electrode tabs 10 of the battery cells C such that the electrode tabs 10 may be sandwiched between the first and second connection tabs 221 and 222.

Figure 9:
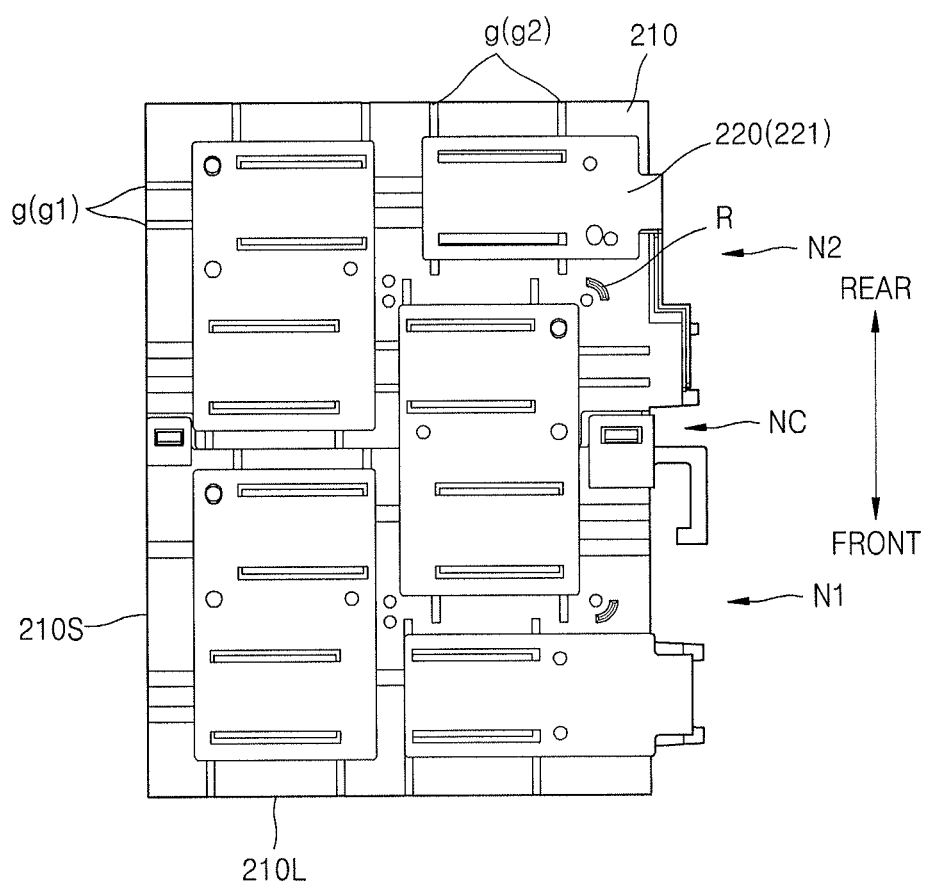
FIGS. 9 and 10 illustrate a plan view and a perspective view of upper sides of cell holders for explaining fume discharge grooves.
Figure 10:
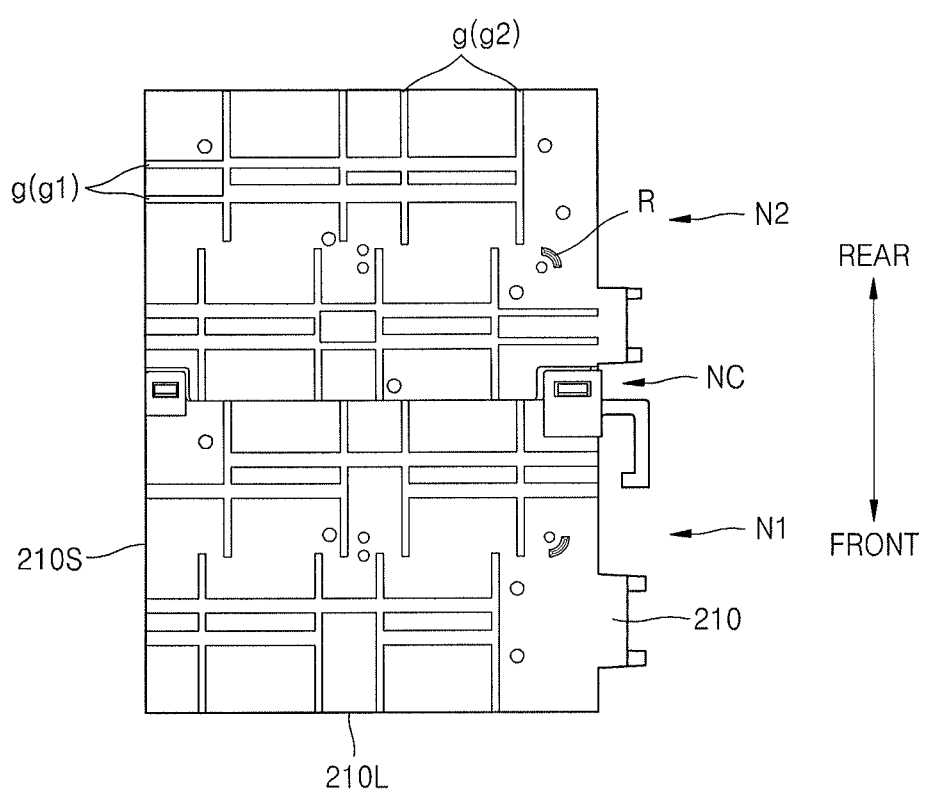

FIGS. 9 and 10 illustrate a plan view and a perspective view of upper sides of the cell holders 210 for explaining fume discharge grooves (g). For clarity of illustration, elements of the cell holders 210 other than the fume discharge grooves (g) are not shown in FIG. 10.

Referring to FIGS. 9 and 10, the fume discharge grooves (g) may be formed in the cell holders 210. The fume discharge grooves (g) may be formed under welded portions (coupling portions) between the connection tabs 220 and the electrode tabs 10. For example, the fume discharge grooves (g) may be formed in regions overlapping the connection tabs 220 (regions under the connection tabs 220) or regions close to the connection tabs 220. The fume discharge grooves (g) may be channels extending from first points to second points of the cell holders 210. For example, the fume discharge grooves (g) may be channels crossing bottom sides of the connection tabs 220 and extending away from the bottom sides of the connection tabs 220. Accordingly, fumes generated during welding of the connection tabs 220 may be easily discharged to the outside. The fume discharge grooves (g) may extend to the outside of the cell holders 210 such that fumes generated during welding may easily discharged to the outside of the cell holders 210.

Referring to FIG. 10, the fume discharge grooves (g) may extend on the cell holders 210 in two directions. For example, each of the cell holders 210 (that is, each of the cell holder 210 of the first unit pack N1 and the cell holder 210 of the second unit pack N2) may include a pair of parallel long sides 210L and a pair of parallel short sides 210S, and the fume discharge grooves (g) may include first and second fume discharge grooves g1 and g2 extending in parallel with the long sides 210L and the short sides 210S. The first and second fume discharge grooves g1 and g2 may be formed at a plurality of positions corresponding to the connection tabs 120.

In the exemplary embodiment, a plurality of battery cells C may be arranged along the short sides 110S of each of the cell holders 210 and coupled to each of the cell holders 210. In the exemplary embodiment, a plurality of unit packs such as the first and second unit packs N1 and N2 may be coupled together according to a desired number of battery cells C of the battery pack. Thus, although the number of battery cells arranged along short sides 210S of each of the cell holders 210 is limited, the battery pack may be configured to have a high degree of output power. If a large number of battery cells were to be coupled to one cell holder 210, it could be difficult to align the battery cells and the cell holder 210. On the other hand, if unit packs each including a relatively small number of battery cells such as the first and second unit packs N1 and N2 according to embodiments are used, the battery pack may be easily assembled.

Referring to FIGS. 9 and 10, the first fume discharge grooves g1 may extend across one or more of the connection tabs 220. At least one of both ends of each of the first fume discharge grooves g1 may extend to the outside of the cell holders 210. For example, the first fume discharge grooves g1 may extend across two or more of the connection tabs 220 in a direction parallel to the long sides 210L, and ends of the first fume discharge grooves g1 may reach the outside of the cell holders 210.

The second fume discharge grooves g2 may extend across the connection tabs 220. At least one of both ends of each of the second fume discharge grooves g2 may extend to the outside of the cell holders 210. For example, the second fume discharge grooves g2 may extend in parallel with the short sides 210S, and ends of the second fume discharge grooves g2 may reach the outside of the cell holders 210. The first and second fume discharge grooves g1 and g2 may extend in different directions and may meet each other in regions of the connection tabs 220 or in regions close the connection tabs 220. Accordingly, when the connection tabs 220 are welded, fumes may be rapidly discharged in two directions.

The battery pack may include a protective circuit module to control charging and discharging operations of the battery cells C. The protective circuit module may monitor the states of the battery cells C. For example, the protective circuit module may measure status variables such as temperature, voltage, and current of the battery cells C and may control charging and discharging operations of the battery cells C based on results of the measurement. To this end, a plurality of sensing lines may be arranged on the cell holders 210. For example, the sensing lines may transmit information regarding the states of the battery cells C to the protective circuit module.

Guide ribs R may be formed on the cell holders 210. The guide ribs R may guide the sensing lines. In more detail, owing to the guide ribs R, the sensing lines used to obtain status information of the battery cells C may be easily arranged without tangles. In addition, the guide ribs R may guide the assembling positions of the sensing lines. Accordingly, interference between components or a short circuit may be prevented. For example, the guide ribs R may guide the sensing lines to bypass paths to prevent overlapping between the connection tabs 220 and the sensing lines.

As described above, according to the one or more of the above exemplary embodiments, the battery cells of the battery pack may be electrically coupled to each other using the connection tabs having an improved degree of coupling strength. For example, owing to the fume discharge grooves formed to rapidly discharge gas and contaminants when the connection tabs are welded, gas or contaminants may not accumulate in welded portions between the connection tabs and the electrode tabs of the battery cells, and damage to the cell holders during a welding process may be avoided.

By way of summation and review, embodiments provide a battery pack in which a plurality of battery cells are electrically combined using a connection tab having improved coupling characteristics without damaging a cell holder.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof the present invention as set forth in the following claims.

What is claimed is:

1. A battery pack, comprising:
   a battery cell including an electrode tab;
   a cell holder through which the electrode tab is inserted;
   a connection tab welded to the electrode tab and providing a welded portion above the cell holder; and
   a fume discharge groove located in a region of the cell holder under the welded portion, wherein the fume discharge groove is in a form of a channel formed in a upper surface of the cell holder, the upper surface of the cell holder being a surface that faces away from the battery cell.

2. The battery pack as claimed in claim 1, wherein the fume discharge groove extends across a bottom side of the connection tab.

3. The battery pack as claimed in claim 1, wherein the fume discharge groove extends across a bottom side of the connection tab between first and second points of the cell holder.

4. The battery pack as claimed in claim 1, wherein the fume discharge groove extends to an outside of the cell holder.

5. The battery pack as claimed in claim 1, wherein a guide rib is located on the cell holder to guide a sensing line.

6. The battery pack as claimed in claim 5, wherein the sensing line is a wire connected to the connection tab or the electrode tab to transmit information about a state of the battery cell.

7. The battery pack as claimed in claim 1, wherein:
   the battery pack includes a plurality of connection tabs, and
   at least one of the connection tabs includes an output terminal extending to a lateral side of the cell holder.

8. The battery pack as claimed in claim 7, wherein a threaded part is coupleable to the output terminal to connect an output cable to the output terminal.

9. A battery pack, comprising:
   a battery cell including an electrode tab;
   a cell holder through which the electrode tab is inserted;
   a connection tab welded to the electrode tab and providing a welded portion above the cell holder; and
   a fume discharge groove located in a region of the cell holder under the welded portion, wherein
   the cell holder is rectangular shaped and includes a pair of parallel long sides and a pair of parallel short sides, and
   the fume discharge groove includes:
      a first fume discharge groove extending in a direction parallel to the long sides; and
      a second fume discharge groove extending in a direction parallel to the short sides.

10. The battery pack as claimed in claim 9, wherein:
    the battery pack includes a plurality of battery cells, and
    the first fume discharge groove successively crosses bottom sides of two or more connection tabs arranged in the direction parallel to the long sides.

11. The battery pack as claimed in claim 10, wherein, the battery cells are arranged in the direction parallel to the short sides.

12. The battery pack as claimed in claim 9, wherein the first and second fume discharge grooves are connected to each other in a region of the connection tab or in a region close to the connection tab.

13. A battery pack, comprising:
    a battery cell including an electrode tab;
    a cell holder through which the electrode tab is inserted;
    a connection tab welded to the electrode tab and providing a welded portion above the cell holder; and
    a fume discharge groove located in a region of the cell holder under the welded portion,
    wherein the cell holder and the connection tab include position aligning portions that provide alignment between the cell holder and the connection tab.

14. The battery pack as claimed in claim 13, wherein the position aligning portions include:
    a protrusion extending upward from the cell holder toward the connection tab; and
    a hole in the connection tab to receive the protrusion.

* * * * *